United States Patent
Gerding et al.

(10) Patent No.: US 9,207,111 B2
(45) Date of Patent: Dec. 8, 2015

(54) METHOD FOR DETERMINING THE FILL LEVEL OF A MEDIUM AND CORRESPONDING DEVICE

(71) Applicant: KROHNE Messtechnik GmbH, Duisburg (DE)

(72) Inventors: Michael Gerding, Bochum (DE); Michael Vogt, Bochum (DE)

(73) Assignee: Krohne Messtechnik GmbH, Duisburg (DE)

(*) Notice: Subject to any disclaimer, the term of this patent is extended or adjusted under 35 U.S.C. 154(b) by 422 days.

(21) Appl. No.: 13/644,021

(22) Filed: Oct. 3, 2012

(65) Prior Publication Data
US 2013/0276529 A1    Oct. 24, 2013

(30) Foreign Application Priority Data
Apr. 24, 2012 (DE) .......................... 10 2012 007 979

(51) Int. Cl.
*G01F 23/296* (2006.01)
*G01F 23/284* (2006.01)
*G01F 25/00* (2006.01)
*G01F 23/00* (2006.01)

(52) U.S. Cl.
CPC .............. *G01F 23/284* (2013.01); *G01F 23/00* (2013.01); *G01F 23/2961* (2013.01); *G01F 23/2962* (2013.01); *G01F 25/0061* (2013.01)

(58) Field of Classification Search
CPC ....... G01F 23/00; G01F 23/22; G01F 23/284; G01F 23/296; G01F 23/2962; G01F 25/0061
USPC ....................... 73/290 R, 290 V; 342/124
See application file for complete search history.

(56) References Cited

U.S. PATENT DOCUMENTS

| | | | |
|---|---|---|---|
| 5,587,969 A | 12/1996 | Kroemer et al. | |
| 6,759,976 B1 | 7/2004 | Edvardsson | |
| 7,046,189 B2* | 5/2006 | Spanke et al. | 342/124 |
| 7,800,528 B2 | 9/2010 | Nilsson et al. | |
| 8,224,594 B2 | 7/2012 | Sai | |
| 8,670,950 B2 | 3/2014 | Griessbaum et al. | |
| 8,776,594 B2 | 7/2014 | Welle et al. | |
| 2011/0261913 A1* | 10/2011 | Fifield et al. | 375/350 |
| 2013/0207836 A1 | 8/2013 | Schmitt et al. | |

FOREIGN PATENT DOCUMENTS

DE    10 2009 055 262 A1    6/2011
EP        2 093 546 A1    8/2009

* cited by examiner

*Primary Examiner* — Hezron E Williams
*Assistant Examiner* — David Z Huang
(74) *Attorney, Agent, or Firm* — Roberts Mlotkowski Safran & Cole, PC

(57) ABSTRACT

A method for determining the fill level of a medium, wherein a transmission signal is transmitted, a return signal is received, and the return signal is evaluated in view of the process variable in a manner which allows a general and flexible handling of interfering signals in the received signals. This result is obtained by filtering at least one of the return signal, a signal derived from the return signal and an envelope curve formed from the return signal into at least one sub-signal, and using said at least one sub-signal for evaluating the return signal for at least determining the fill level.

3 Claims, 3 Drawing Sheets

METHOD FOR DETERMINING THE FILL LEVEL OF A MEDIUM AND CORRESPONDING DEVICE

BACKGROUND OF THE INVENTION

1. Field of the Invention

The invention relates to a method for determining the fill level of a medium according to the transit time method, wherein at least one transmission signal is transmitted, wherein at least one return signal is received, and wherein the return signal is evaluated at least in view of the process variable "fill level".

2. Description of Related Art

When it is said that the method is intended for determining the fill level, and that the return signal is evaluated in view of the fill level, then such methods are meant, in which the fill level is only monitored, i.e., in which no continuous determinability of all fill levels must be present. In the same manner, the evaluation of the fill level does not only include displaying the level, this means that the return signal is processed with regard to the fill level, for example, is made available as a current or voltage signal for further processing. The transmission signals and the received signals are typically, in particular, electromagnetic signals, but of course, other signals are suitable, for example, sound waves.

Furthermore, the invention relates to a corresponding device for determining the fill level of a medium having at least one transmitting unit for transmitting at least one—in particular, electromagnetic—transmission signal, having at least one receiving unit for receiving at least one—in particular, electromagnetic—received signal, and having at least one evaluating unit for evaluating the received signal.

In industrial measurement technology, radar level measuring devices are frequently used to determine the level of media, such as liquids, bulk solids or sludge inside of containers, such as tanks, silos or tubes. The transit time method carried out by the measuring device is based on the physical law that the transit distance, e.g., of an electromagnetic signal is equal to the product of the transit time and propagation velocity. If the fill level of a medium in a container is measured, the transit distance corresponds to twice the distance between an antenna emitting the electromagnetic signal and receiving it again and the surface of the medium. The wanted echo signal—i.e., the signal reflected on the surface of the medium—and its transit time are mostly determined based on the so-called echo function or, respectively, digitized envelope curve. The envelope curve represents the amplitudes of the echo signals as a function of the distance "antenna—surface of the medium" or the transit time of the signal. The fill level can be calculated from the difference between the known distance of the antenna to the base of the container and the distance of the surface of the medium to the antenna as determined by measurement. The transmitted and received electromagnetic signals are mostly microwave radiation. Measurements using ultrasonic waves are also possible.

In practice, the return signal contains, unfortunately, not only of the actual echo signal reflected on the surface of the medium, but also interfering signals, for example, of multiple reflections resulting after partial penetration of the signal into a medium—in particular, a very dry one having low electric conductivity—or from reflections on the container walls, welding seams, recesses in the wall, mixers, filling lines, or the like. Material cones generally cause diffuse and directional backscatter derived from both the surface and angle of repose of the material cone itself. These interfering signals complicate the evaluation of the return signal and can lead to measurement errors. Great difficulties occur particularly in media having a small dielectric constant and low electrical conductivity.

German Patent Application DE 10 2009 055 262 A1 describes a method for determining the fill level using received signals with interfering signals. Comparison signals can be determined from the expected response signals in a learning phase as a result of application- and device-based test signals. In an operating phase, the received signals are compared with the reference signals, and when a deviation above a threshold value of the received signals occurs, the level is determined. In DE 10 2009 055 262 A1, other methods for evaluation of such received signals of the prior art having interference are also discussed.

The disadvantage of the prior art is that, in most cases, only methods that act selectively and are generally complex are provided for signal evaluation.

SUMMARY OF THE INVENTION

A primary object of this invention is, thus, to provide a method for determining the fill level of a medium that allows a general and flexible handling of interfering signals in the received signals.

The indicated object is initially and essentially met according to the invention using the method discussed here, in that the transmission signal with adjustable transmission signal characteristics is transmitted in such a manner and/or that the return signal with adjustable receiving characteristics is received in such a manner and/or that the return signal and/or a signal derived from the return signal is evaluated using adjustable evaluation criteria in such a manner that the return signal and/or the signal derived from it are filtered into at least one sub-signal. Although the procedure is discussed and explained below in relation to fill level determination by means of the transit time method, the method according to the invention can generally be used in any method for the determination of different process variables. Common to the determination or monitoring methods, is that a transmission signal is transmitted and received again as a received signal, wherein the process variable fill level can be determined from the return signal or can imply a change in the process variable fill level.

The return signal is essentially and for simplified observation composed of the actual echo signal of the transmission signal on the surface of the medium and of interfering signals caused by other reflections, etc. For evaluation, information from the return signal generally is reduced in that an envelope curve of the return signal is formed and is further processed. Therefore, in particular, the signal in the envelope curve is derived from the return signal (specifically, for example: the envelope curve of the return signal strength is plotted against distance/time). In the following, therefore, the evaluation of the return signal refers also respectively to the evaluation of the envelope curve, or in general to the evaluation of the signals derived from the received signal. Depending on the configuration, the return signal is processed multiple times in partial steps of evaluation or processing, or several derived signals can be generated therefrom.

The invention is based on the finding that the return signal is composed of several superimposed coherent backscattered signals that can have respective, different signal characteristics. This also means that the return signal has quasi portions or components having different characteristics, in which possible different sub-signals are superimposed, amplified, attenuated or cancel each other out. In this manner, for example, sub-signals originate from different spatial areas, when individual signals come from the reflection on the surface of the medium, and other signals come from reflections on the container walls. Furthermore, individual signals can differ in transit time. This can be seen when signals directly reflected on the surface of the medium are compared with multiply reflected signals. Furthermore, depending on the reflective surface, influences of polarization can also occur, so that the sub-signals differ in their polarization. Overall, there are a number of characteristics, in which the sub-signals in the return signal differ and, thus allow for a separation from one another again—and possible selective evaluation. As a result, a diversity of information is received.

In the method according to the invention, the transmitting of the transmission signal, the receiving of the return signal and/or the evaluation of the return signal is carried out such that the return signal is divided into at least one sub-group with respect to signal characteristics, in that it is thus filtered into at least one sub-signal. Advantageously, several sub-signals are produced and evaluated. This is done individually for transmitting, receiving, or evaluating or suitable combinations are made in order to achieve the desired effect. In the method according to the invention, the components contributing to the variety of the return signal are organized by their respective characteristics, so as to obtain the filtered sub-signals of the sub-groups. The sub-signals allow for an easier (sub-)evaluation of the return signal preferably because of their specific dependencies on the type of reflection(s)/scattering(s) creating them.

In one embodiment, the transmission signal characteristics and/or the return signal characteristics and/or the evaluation criteria is/are a frequency and/or a frequency band and/or polarization and/or a solid angle, and/or signal form and/or a signal receiving time. The characteristics of the return signal are, in particular, also frequency, polarization, time (i.e., in particular, the time between transmitting the transmission signal and the arrival of the return signal at the receiver) or the solid angle from which the return signal originated.

The following features relate, in particular, to the nature of the evaluation of the received signal. In one version, it is provided that the return signal and/or an envelope curve formed from the return signal and/or the signal derived from the return signal is/are filtered into one sub-signal using at least one of the evaluation criteria frequency or polarization or solid angle or signal receiving instant as a filter dimension. The signal dependent on the return signal or, respectively, derived from it for further processing and/or evaluation is generated in particular by using a Fourier transformation or an inverse Fourier transformation. The Fourier transformation or the inverse Fourier transformation is applied possibly more than once in other designs or more than once in the filtering or further processing of the respective sub-signals, or signals derived from them, in each case.

In one embodiment, the return signal or a signal dependent thereon (in which the envelope curve is to be counted) is subjected to several filters, between which optionally further different processing steps are applied, such as said Fourier transformation. The evaluation criteria are, for example, frequency, polarization, solid angle or transit time. If, for example, the return signal is filtered according to frequency or within frequency ranges—frequency bands and sub-frequency bands—, sub-signals result that are within the predetermined frequencies. The same applies for sub-signals with respect to polarization or solid angle. When considering the solid angle, it is necessary to consider, depending on the application, that the fill level of the medium may be uneven, e.g., may have a material cone, so that the signals reflected from the surface do not come only from one spatial area or from one direction.

The following features relate to the use of the filtered signals as sub-signals of the received signal. It is provided, in one embodiment, that the return signal and/or the envelope curve and/or the derived signal is/are filtered into at least one sub-signal with different evaluation criteria as filter variables. Information is obtained from the sub-signals, which is compared and/or combined, wherein preferably at least this results in general information about the process variable, i.e., the fill level. In this version, the return signal or a signal dependent thereon and produced therefrom is classified into sub-signals according to filter and information is extracted from the sub-signals. The sub-signals are disjoint in one version and overlap partially in another. If the filter size is, for example, the frequency, then overlapping frequency bands may be used for filtering. Signal peaks, their location and amplitude or their shape in the sub-signals are examples of the determined information. Other parameters that can be recovered from the sub-signals and are used for identification and classification are, for example, signal energy, signal power or signal amplitude, etc. These parameters can, for example, be calculated from the sampled signals, an envelope curve detection or a maximum search. An evaluation involves a threshold value detection being applied to the sub-signals. Furthermore, these parameters allow also an application as a measure of the probability of the reliability of the identification. In addition, the parameters obtained from the sub-signal can be used for evaluating another sub-signal better, faster or easier.

In one version, the sub-signals with known and suitably stored comparison signals are compared. The sub-signals are subjected, depending on design, to further filtering with the same respective evaluation criterion, but with other limits or parameters, or other evaluation criteria. The type of filtering or processing can generally be fixed or can be adjusted as needed depending, e.g., on the signal quality or the kind of signals occurring. The information from the sub-signals as a sub-system of the return signal are suitably combined or compared to one another in order to obtain an overall indication of the process variable. If necessary, the extracted information is used in the further processing of the optimally matched sub-signals or the received signal.

Alternatively, the information is used to better adapt the transmission of the transmission signal or the receiving of the return signal in subsequent measurements. Furthermore, the evaluation of plausibility considerations can be implemented or information from a sub-signal is used to clarify the evaluation of another sub-signal. In the process, information originates, depending on the design of sub-signals, which has the same filtration with respect to the evaluation criterion (e.g., frequency, polarization, solid angle, transit time), but generated with different parameter values (different frequency ranges; horizontal or vertical polarization, solid angle directly toward the medium or with lateral inclination, periods between zero and a maximum expected time or times that clearly surpass expectations), or from sub-signals as a result of filtering with different evaluation criteria. The advantage consists in the subdivision into sub-signals, which, if necessary, can be evaluated more easily and, in each case, provides the specific information, which is less accessible or even lost in the return signal due to the superimposition. Another advantage results from the fact that also more sophisticated evaluation of complex surface structures is easily implemented. Consequently, three-dimensional surface measurements are made in this manner.

The information from the sub-signal is obtained, in particular, in one version, in that, at least one partial signal is identified from the sub-signal. A partial signal is, in particular, a signal peak of the amplitude, which is different from surrounding signals. In the simplest case, therefore, detection of the largest signal is used for this partial signal identification. The partial signal can be the actual wanted echo from the surface of the medium, but it can also be an interfering signal. In the present case of the determination and monitoring of the fill level as a process variable by means of a transit time method in general, the occurrence of such a partial signal, which is characterized in particular by its form or its location, is associated with a reflection. With other methods (for determining possible other process variables), these partial signals result therefore due to other conditions.

Since the sub-signals have different meanings, depending on whether it is a wanted signal in relation to the fill level or an interfering signal, it is provided, in one version, that the identified partial signal is assigned to one class of at least two signal classes—in particular classes echo signal (i.e., a reflection signal from the surface of the medium for the process variable fill level), or interfering signal. After identification, in this design, the partial signal found within the sub-signal caused by filtering the return signal is sorted into one of two signal classes or types of partial signals. The distinction between "echo signal" as the signal of interest reflected on the surface of the medium and "interfering signal" is of interest. Information or parameters possibly extracted from the sub-signals are used for the classification of sub-signals. Here, in one view, the sub-signals are considered as random variables that carry information about the actual wanted signals or interfering signals. This results in, for example, statistical parameters regarding the variations of the sub-signals, or correlations with each other. Therefore, statistical methods can also be used to gain information from the sub-signals and to enable identification and classification.

In the previous version, the partial signals are subjected to a classification after their identification, and in particular, for further use of the sub-signals and the resulting extracted information. There are two sources of error here. One of these is the identification of the partial signal and the other is its classification in one of at least two signal classes. During both steps, errors can occur or both statements are associated with some degree of certainty or uncertainty. Therefore, in one version, a respective probability of the reliability of the identification or classification is specified during identification and/or classification. The signal-to-noise ratio can be used for the evaluation of the identification, for example, or the proximity between adjacent signals, one of which being identified as partial signal. In at least one subsequent step, the fusion of information from sub-signals with the overall information is controlled using this information about the respective probability in that the information is weighted appropriately, if necessary. To get to the measures for the probability of the reliability of the classification, for example, methods of multivariate feature analysis can be used in terms of characteristics of the classes "echo signal from the surface of the medium" or "interfering signal" in the feature values, such as the distance measures, e.g., Euclidean distance or Mahalanobis distance.

In the following, the designs deal with the interplay of transmitting the transmission signal, receiving the return signal and evaluating the received signal.

In one version, the return signal is received with adjustable receiving characteristics and the return signal and/or the derived signal is evaluated in accordance with the receiving characteristics—in particular, filtered. In this design, a pre-filter is generated right when the return signal has been received before filtering in the scope of evaluation, in that the return signal is received with predetermined or adjustable receiving characteristics. Filtering involves either attenuating signal sections or completely blanking out of sections of the signal. In the receiving unit, for example, a particular polarization is set for receiving the signal so that, even at the time of recovery of the received signal, filtering takes place with respect to polarization. Alternatively or additionally, the return signal is received only over an adjustable period of time, so that signals resulting, for example, from multiple reflections and therefore having a much greater transit time, are not received, and thus, are filtered out. Furthermore, in one embodiment, the receiving unit in the form of a receiving antenna is aligned such that essentially only the signals from the associated spatial area are received. Evaluation is thus coupled with the nature of reception, in order to suitably design the evaluation and to incorporate the pre-filtering.

In a further embodiment, the transmission signal is transmitted with adjustable transmission signal characteristics and the return signal and/or the derived signal is evaluated in accordance with the transmission signal characteristics—in particular, filtered. In this design, the transmission signal is produced with predetermined properties, leading to the fact that the return signal has already been filtered in advance or some signals experience a different weighting, e.g., attenuation or amplification. This pre-setting is taken into consideration for evaluation or it is included in filtering and further evaluation.

In an additional version of the method, the last two embodiments are combined, so that the transmission and reception each take place with specific characteristics. In the evaluation of the resulting received signal, both pre-settings are taken into consideration, i.e., transmitting the transmission signal, receiving the received signal, and evaluation of the return signal are coordinated. For accurate evaluation or setting of the transmitting and receiving parameters, for example, a neural network is accessed in one design. In order to obtain information, numerical classifiers (e.g., minimum-distance classifier, Bayes classifier, maximum likelihood classifier, nearest neighbor classifier, etc.) or fuzzy classifiers can be used for classification or identification in addition to neural networks. In this respect, previously known parameters, etc. can be used or a learning process is performed for evaluation, further processing or filtering, which leads to independent optimization of the evaluation and/or filtering.

Furthermore, the previously derived and described object is met with a further teaching of the invention with a device for the above-mentioned determination of the fill level of a medium having at least one transmitting unit for transmitting at least one—in particular, electromagnetic—transmission signal, having at least one receiving unit for receiving at least one received signal, and having at least one evaluating unit for evaluating the received signal. Presently, the transmitting unit and/or the receiving unit and/or the evaluating unit is/are designed to implement the method according to at least one of the above-mentioned versions.

In one design of the device, at least one control unit is provided, which coordinates the transmission unit and/or the receiving unit and/or the evaluation unit with one another, and if necessary, acts in a controlling or regulating manner.

In a further embodiment, at least one storage unit is provided alternatively or additionally in which the evaluation unit stores—in particular, in the evaluation unit—obtained information and/or overall information as history data. The evaluation unit uses the history data of the storage unit for the collection of information and/or overall information. In this embodiment, stored data are used for evaluation of the currently return signal or the envelope curve or sub-signals created by filtering. If, for example, it is known from a measurement which interfering signals are caused by which known and preferably fixed disrupters, then evaluation can correspondingly be simplified in that, for example, these interfering signals are blanked out according to the situation in the return signal or the amplitude. Furthermore, if, for example, the rate of change of the fill level is known, then the next value of the echo signal can be more quickly and easily reached due to a previous identification of the echo signal from the surface of the medium.

In detail, there are a number of possibilities for designing and further developing the method according to the invention and the corresponding device according to the invention for determining the fill level of a medium as will be apparent from the following description of embodiments in conjunction with the accompanying drawings.

DETAILED DESCRIPTION OF THE INVENTION

Figure 1:
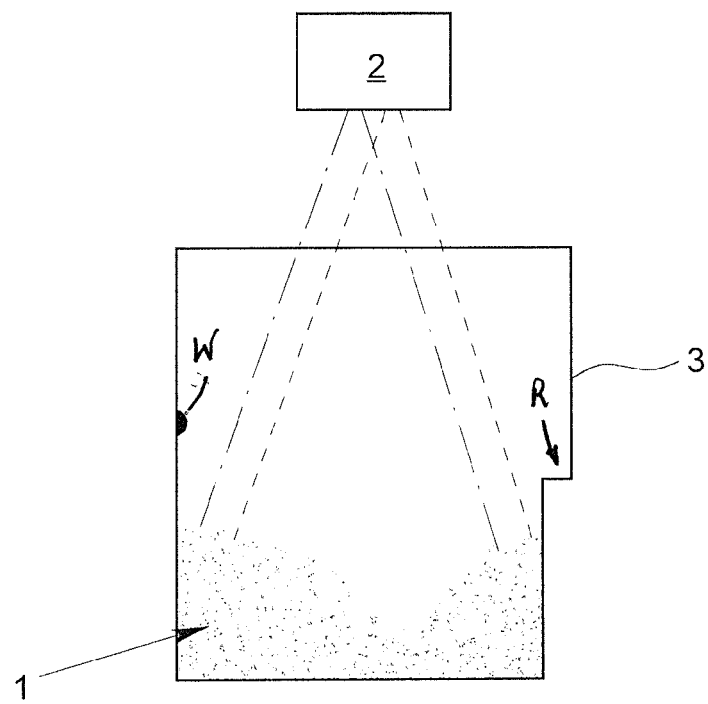
FIG. 1 is a schematic representation essentially showing the functional cause and effect relationship of a fill level measurement by means of the transit time method.
Figure 2:
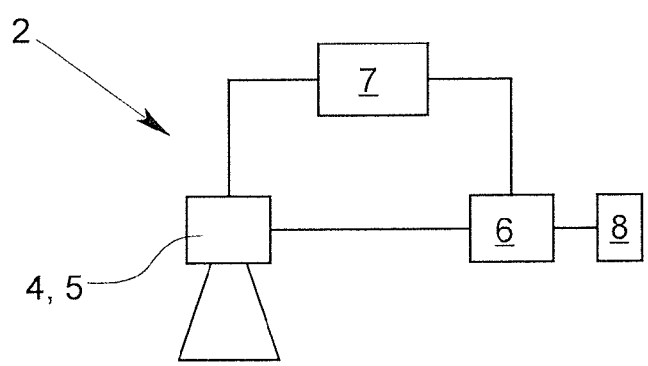
FIG. 2 is a schematic representation essentially showing the functional cause and effect relationship of a measuring device.
Figure 3:
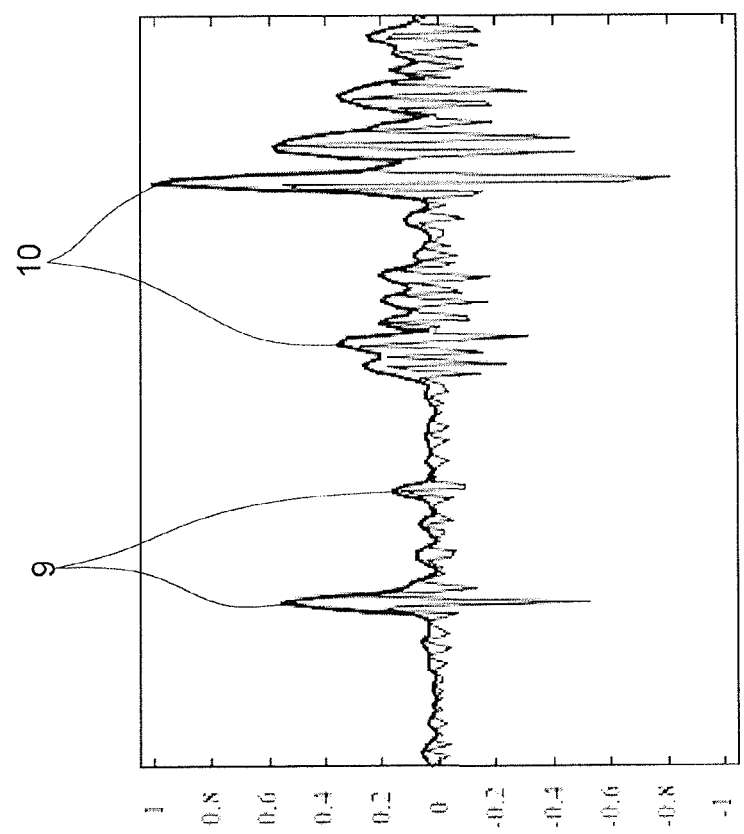
FIG. 3 is a schematic representation of a return signal in an envelope curve of a measurement with the construction shown in FIG. 1.
Figure 4:
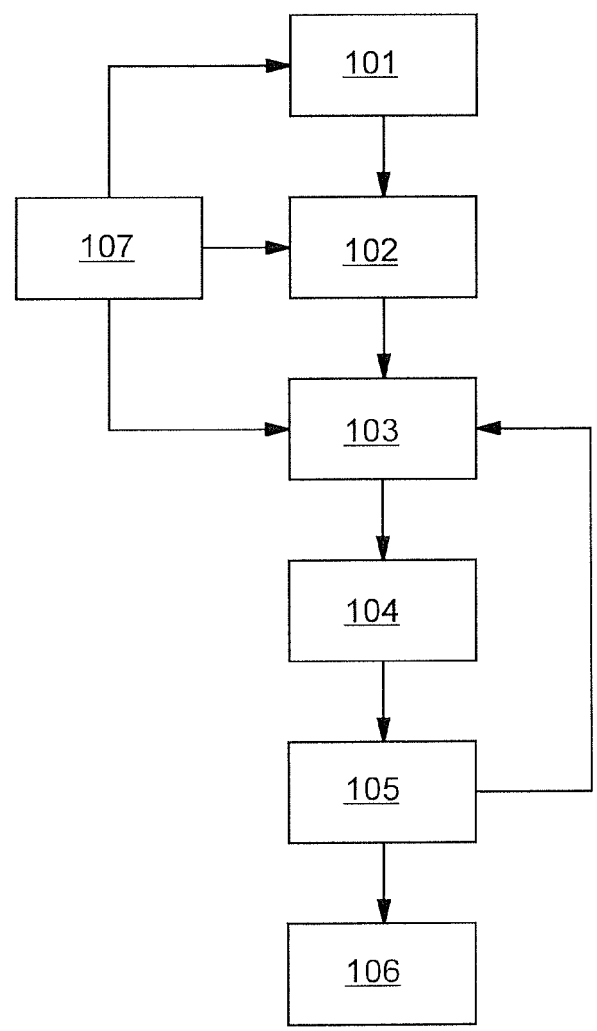
FIG. 4 is a flow chart showing relationships of a method for measuring the fill level with the construction shown in FIG. 1.

A construction for measuring the fill level is schematically shown in FIG. 1, in which a return signal as shown in FIG. 3 is obtained with a measuring device as schematically shown in FIG. 2, wherein the measurement corresponds to the sequence schematically shown in FIG. 4.

FIG. 1 shows a measuring arrangement, in which the fill level of the medium 1 is determined by the measuring device 2. The medium 1 is a bulk material, which, in this case, does not have a flat surface, but rather wavy contour due to the material cone. The medium 1 is in a container, which has disturbances in the form of a welding seam W on the left side and a recess R on the right side. If the transmission signal of the measuring device 2 meets one of these disturbances, this results in signals received by the measuring device 2 that, in the worst case, can lead to the signal from the surface of the medium 1 being mistaken and a wrong value being calculated for the fill level.

In the illustrated embodiment, the evaluation must also be more complex than in the case of a planar surface of a medium 1 due to the special surface topology of the medium. In a particularly dry medium 1, it can also occur that the electromagnetic transmission signals first penetrate a little before they are reflected back again, so that inaccurate values for the fill level can also be the result. As shown here in a partially closed container 3, the signals may experience multiple reflections that are possibly received significantly later by the measuring device 3, and can, however, lead to a fill level being determined that is much too low.

In determining the fill level, the fact that the transit time of the electromagnetic signals is dependent on their—generally known—propagation velocity and the distance between the transmitter and the reflective surface of the medium 1 and between the surface and the receiver of the signals. In most implementations, the transmitter and receiver are implemented by the same antenna. The solid angle at which the signals are transmitted from the measuring device 1 is indicated, in one case as a dotted line and again as a dot-dashed line, wherein this corresponds to the embodiment in which a transmission unit of the measurement device 2 transmits the transmission signal into different spatial areas.

FIG. 2 shows a block diagram of one embodiment of a measurement device 2, which includes a combined transmitting and receiving unit 4, 5 with a horn antenna. This transmitting and receiving unit 4, 5 generates the electromagnetic transmission signal, emits it, and also receives the return signal. Thereby, the parameters for transmitting or generating the transmission signal and the parameters for receiving the return signal can be individually and preferably changed or set. The evaluation unit 6 downstream from the combined transmitting and receiving unit 4, 5 evaluates the electromagnetic return signal and determines, in particular, a value for the process variable fill level. In the example shown, a separate control unit 7 is provided which carries out the co-ordination between the transmission 4, receiving 5 and analyzing units 6, and tunes them relative to each other for filtering the return signal into sub-signals or processing the information obtained from the sub-signals. The evaluation unit 6 uses a storage unit 8 for processing the signals or information, in which sub-signals from at least one previous measurement are deposited for reference and identification purposes.

FIG. 3 shows a section of a return signal with the associated envelope curve. The individual amplitudes of the return signal are plotted over the run time. The envelope curve or amplitude with its significantly calm course means a reduction of information of the received signal, which demonstrates a facilitative simplification of the evaluation of most substantial signals for determining the fill level based on the transit time method in the prior art. Four partial signals 9, 10 are seen in the envelope curve, which differ in amplitude from the other signals and thus protrude. Corresponding algorithms are known from the prior art to identify such partial signals. It is simpler to identify the partial signals 9, 10, when the return signal or the envelope curve is broken down into four sub-signals, for example, on the basis of transit times. This allows, for example, the same computer routine to be run, in which only one maximum is determined in the extraction of information for the identification of the partial signals following the generation of the sub-signals.

As shown in FIG. 1, two reflections originate from the medium 1 and two reflections are interfering signals due to reflections from the welding seam or the recess of the wall. For further processing, another classification of the partial signals 9, 10 has to be carried out after identifying the partial signals 9, 10. What follows from the comparison of the signal of FIG. 3 with the structure of FIG. 1 is that the interfering signals are closer to the measuring device 2, and thus also have a shorter transit time than the signals produced by the reflection on the surface of the medium. For this reason, the first two partial signals 9 in FIG. 3 are interference signals and the two other partial signals 10 originate at the surface of the medium. Filtering the wanted echo signals may also be carried out, for example, by controlling the time of receiving the received signal, in that the signal is registered only after the expiration of a certain time. In this example, the advantage of a storage unit 8 also becomes clear, which involves being able to store the information that two echo signals from the surface of the medium at the given state of the medium appear in the received signal.

A schematic sequence of the method is shown in FIG. 4. The transmission signal is preferably transmitted or sent toward the medium in step 101 using settable signal transmission characteristics as a transmission parameter or as a signal generating parameter. The parameters of the transmission characteristics, for example, are frequency, polarization angle or solid angle at which the transmission signal is sent. Subsequently, the reflection of the transmitted signal toward the receiver interacts with the medium or with its surroundings (e.g., container wall or installations). In the next step 102, the return signal is received with adjustable receiving characteristics. These parameters are, for example, polarization, also frequency or the transit time up to which the return signal is still received. The solid angle from which the return signal is received, can be implemented, for example, by pivoting or moving an antenna for reception.

In step 103, which is already a part of the evaluation of the received signal, the return signal is subjected to filtering, so that at least one sub-signal results, which, in step 104, supplies at least one piece of information or a characteristic or, respectively parameter, in particular, for subsequent identification of at least one partial signal within the sub-signal. The subsequent identification—particularly in step 105—is carried out in one embodiment by means of the Hilbert transformation and absolute value measurement as a variation of identification based on the amplitude of the envelope curve. A Fourier transformation of the return signal is initially carried out for frequency filtering of the time signal. The spectrally filtered sub-signal is then subjected to an inverse Fourier transformation for the identification of at least one sub-signal (or a particularly characterized peak) in step 105, so that a time signal again results. Subsequently, the identified partial signal is classified—for example, via analysis of variation—i.e., assigned to one of at least two classes. These are, in particular, the two classes "echo signals from the surface of the medium" and "interfering signals". In particular, the information from the analysis of the sub-signals in step 104 is used for identification and classification. In one embodiment, classification is carried out independent of identification.

Between the individual steps of the evaluation—as described above—a Fourier transformation, and subsequently, an inverse Fourier transformation of the sub-signal or further processing takes place if necessary, depending on the type of filtering or type of processing or evaluation. The type of processing or the evaluation steps optionally depend, in each case, on the type of filtering that is used with regard to the received signal. The Fourier transformation is used, in particular, after the return signal has been subjected to a previous frequency filtering. Alternatively, the envelope curve is obtained by a Hilbert transformation. In view of filtering with respect to polarization, solid angle, or transit time, sub-signals result in that the received signals with different polarization are used or put through (i.e., gating in respect to polarization) or in that signals from different directions are obtained by pivoting the antenna beam (i.e., gating with respect to direction) or in that the received signals are recorded at different measured points in time (i.e., gating in respect to receiving time in the sense of time-gating).

The output of step 105 preferably comprises echo signal information identified as valid or detected from the surface of the medium as a function of the transit time of the signals or the distance from the antenna, or, respectively echo signal information identified as such. In step 105, process variables, such as the distance can be determined, also from the signals detected as valid, for identification and classification. Optionally, evaluation data or information, which is superimposed by interfering signals or is false, is cut out or blocked out based on known relationships in the measurement environment, such as the known distance of disrupters. Furthermore, in a variation of evaluation, the echo signal information identified as valid or detected from the surface of the medium can be interpreted as a probability density function subject to the transit time of the signals or the distance, wherein evaluation is carried out in terms of the process variable fill level using statistical distribution parameters: for example, the emphasis as estimator for the mean distance between the antenna and the surface of the medium or, respectively, the empirical variance, standard deviation as an estimate of variation in distance. For example, model-based estimates of the probability density function or parameters from it can also be used.

The sequence of filtering in step 103, extraction of information or parameters, etc. in step 104, and identification or classification in step 105 is run repeatedly, if necessary. In this process, the return signal is filtered to some extent into sub-signals with different filters, and the sub-signals are subjected to some extent to additional filtering or other further processing.

In a variation, the return signal is initially filtered based on frequency, and then, based on the polarization direction. Alternatively, and not shown, such filtering with respect to the polarization direction already takes place when the return signal is received in step 102 and, thus, before frequency filtering.

In step 106, the individual information from the sub-signals is compiled in order to obtain overall information about the process variable fill level. Steps 103-105 can be summarized here as pre-processing, wherein the actual evaluation takes place in step 106. In step 106, probabilities are preferably also used in identifying and classifying the sub-signals for the evaluation of the information from the sub-signals to obtain a reliable indication of the fill level.

Step 107 allows coordination between the transmitting of the transmission signal in step 101, the receiving of the return signal in step 102 and the beginning of evaluation of the return signal in step 103.

What is claimed is:

1. A method for determining the fill level of a medium according to the transit time method, comprising the steps of:
   transmitting at least one transmission signal,
   receiving at least one return signal, and
   evaluating said return signal determining the fill level,
   wherein evaluating said return signal comprises the following steps:
   applying a Fourier Transformation to said return signal,
   frequency filtering said Fourier transformed return signal into sub-signals by breaking down the Fourier transformed return signal into sub-signals on the basis of frequency,
   applying an inverse Fourier Transformation to said sub-signals,
   identifying at least one partial signal within said inverse Fourier transformed sub-signals,
   classifying said at least one identified partial signal as one of an echo signal or an interference signal,
   evaluating a respective probability of reliability of identification and of classification of the partial signals identified within the sub-signals, and
   combining information about the at least one identified partial signal of the sub-signals, information about the classification of the at least one identified partial signal, and respective probabilities of reliability of identification and of classification for determining the fill level of the medium.

2. The method according to claim 1, wherein said Fourier transformed return signal is frequency filtered in sub-signals partially overlapping each other.

3. A device for determining a fill level of a medium comprising:
- at least one transmitting unit for transmitting at least one transmission signal,
- at least one receiving unit for receiving at least one return signal, and
- at least one evaluating unit for evaluating said at least one return signal,
- wherein said evaluating unit has means for performing the following operations while evaluating said return signal:
- applying a Fourier Transformation to said return signal,
- frequency filtering said Fourier transformed return signal into sub-signals by breaking down the Fourier transformed return signal into sub-signals on the basis of frequency,
- applying an inverse Fourier Transformation to said sub-signals,
- identifying at least one partial signal within said inverse Fourier transformed sub-signals,
- classifying said at least one identified partial signal as one of an echo signal or an interference signal,
- evaluating a respective probability of reliability of identification and of classification of the partial signals identified within the sub-signals, and
- combining information about the at least one identified partial signal of the sub-signals, information about the classification of the at least one identified partial signal, and respective probabilities of reliability of identification and of classification for determining the fill level of the medium.

* * * * *